Nov. 17, 1925.
C. M. TAYLOR
1,562,386
FLOOR COVERING AND PROCESS OF MAKING THE SAME
Filed Sept. 27, 1924
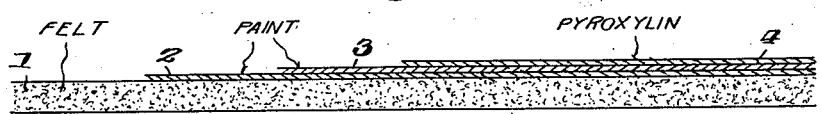
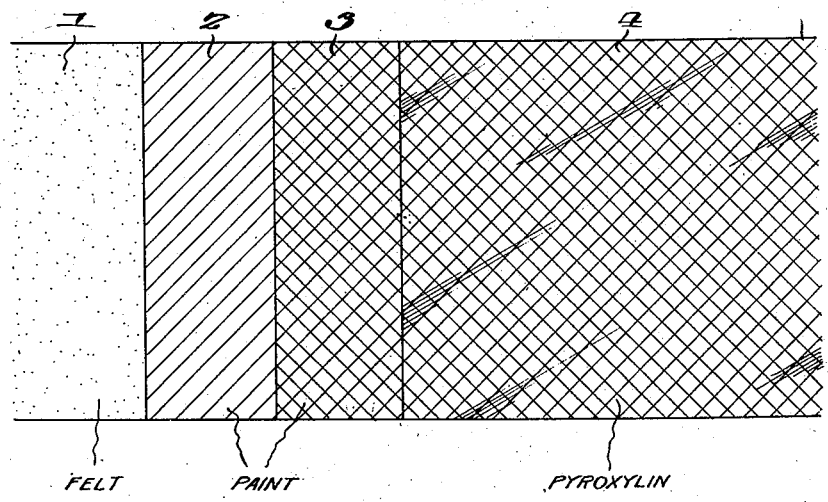
Inventor
Caleb Marshall Taylor,
By Prentiss, Stone & Boyden
Attorneys Patented Nov. 17, 1925.

1,562,386

UNITED STATES PATENT OFFICE.

CALEB MARSHALL TAYLOR, OF ELIZABETH, NEW JERSEY.

FLOOR COVERING AND PROCESS OF MAKING THE SAME.

Application filed September 27, 1924. Serial No. 740,225.

*To all whom it may concern:*

Be it known that I, CALEB MARSHALL TAYLOR, a citizen of the United States, residing at Elizabeth, in the county of Union and State of New Jersey, have invented certain new and useful Improvements in Floor Coverings and Processes of Making the Same, of which the following is a specification.

This invention relates to floor coverings and to the process of making the same, and is particularly directed to the manufacture of felt base floor coverings.

The present invention provides a transparent, flexible and tough wear coat over the surface of the paint coat or coats, and in contrast to the wearing quality of paint, it provides a surface of material not easily saponifiable, which will resist the action of soap and water.

In the accompanying drawing there is illustrated the relative position of the wear coating with respect to the base. Figure 1 represents an enlarged sectional view showing a felt base 1 covered with two coats of paint, and having an outer coat of pyroxylin which has been previously prepared in accordance with the details hereinafter set forth.

Figure 2 is a plan view of the material shown in Figure 1 indicating the transparency of the other coat. Referring in detail to each of the figures of the drawings, 1 indicates the felt base, 2 a sealing coat of paint, 3 a decorative paint coat, and 4 the outer wear coat of the cellulose ester material.

The floor covering of the present invention may be prepared by using the impregnated base. Such a base may be the present known asphalt or bitumen impregnated felt, or the base may be prepared by impregnating with a saturant solution of a cellulose ester as described in my copending application, Serial No. 528,297, filed January 10, 1922. The completed base is coated with paint and the paint coat is then dried. An outer coating of a cellulose ester solution is then applied by dipping the painted base or by brushing the solution over the paint coat, or by spraying, or by any suitable spreading means, and finally the cellulose ester coating is dried.

In the preparation of the cellulose coating solution acetyl cellulose may be used instead of nitrocellulose.

One satisfactory solution for the material of the outer coating may be made by using twenty parts by weight of dry pyroxylin, nitro cotton, in a solvent mixture composed of thirty parts of either or both butyl alcohol or amyl acetate plus thirty parts by weight of anhydrous denatured ethyl alcohol. Twenty to thirty parts by weight of raw castor oil is added as a softener. Tricresylphosphate or diethyl or dibutyl thalate may be used as softeners, using these in the same proportions as the raw castor oil is specified.

To get the proper consistency for the material of the outer coating, a thinner, under ordinary conditions, would be a mixture of either the butyl or amyl acetate with the anhydrous denatured ethyl alcohol. In other words, the proportion of the solvent may be varied slightly as the conditions vary, according to the judgment of the worker. In case the humidity is very high, a thinner consisting of 50% of either butyl or amyl alcohol and 50% butyl or amyl acetate may be used as a thinner in order to eliminate the "blush".

Another satisfactory solution for the material of the outer coating may be made by using 20 parts by weight of pyroxylin, and a solvent mixture composed of 12 parts by weight of butyl alcohol, 18 parts by weight of ethyl acetate, and 30 parts by weight of anhydrous denatured ethyl alcohol. To this mixture should be added 15 or 20 parts by weight of raw castor oil.

These solutions are peculiar in that they do not tend to soften, dissolve or remove the paint coat when the solution for the film is applied directly to the paint.

The floor covering embodying this invention may be used without the need of spacing paper in the shipment of such floor coverings, whether the coverings are in roll form or stacked in layers. Heretofore it has been necessary to have spacing paper between adjacent layers in order to prevent the paint coats from adhering. The material possesses good wearing qualities and is tough and flexible, and does not soil as readily as paint or varnished surfaces when in service.

This application is a continuation in part of my applications, Serial No. 528,299, filed January 10, 1923, and Serial No. 681,110, filed December 17, 1923.

I claim:

1. A floor covering comprising a felt base impregnated with a flexible filling material, an outer wear coating of a transparent film of a cellulose ester, and immediately beneath said film and between said film and said felt base, a paint coat visible through the film.

2. A floor covering comprising a felt base impregnated with a flexible filling material, an outer wear coating of a film of a cellulose ester, and immediately beneath said film and between said film and said felt base, a paint coat.

3. A floor covering comprising a felt base impregnated with a flexible filling material, a coating of paint supported on said felt base, and an outer coating of a film of a cellulose ester.

4. A floor covering comprising a felt base impregnated with a flexible filling material, a coating of paint supported on said felt base, and an outer coating of a mixture of a cellulose ester and a softening medium.

5. A floor covering comprising a felt base impregnated with a flexible filling material, a coating of paint supported on said felt base, and an outer coating of an imperforate film of nitrocellulose.

6. A floor covering comprising a felt base impregnated with a flexible filling material, a coating of paint supported on said felt base, and an outer coating of an imperforate film formed of a mixture of nitrocellulose and a softening medium.

7. A floor covering comprising a felt base impregnated with a water resistant material, a coating of paint supported on said felt base, and an outer coating of a film of a cellulose ester.

8. A floor covering comprising a felt base impregnated with a water resistant material, a coating of paint supported on said felt base, and an outer coating of a mixture of a cellulose ester and a softening medium.

9. A floor covering comprising a felt base impregnated with a water resistant material, a coating of paint supported on said felt base, and an outer coating of an impervious film of nitrocellulose.

10. A floor covering comprising a felt base impregnated with a water resistant material, a coating of paint supported on said felt base, and an outer coating of an impervious film formed of a mixture of nitrocellulose and a softening medium.

11. The process of making a floor covering which comprises impregnating a felt base with a flexible filling material, coating said felt base with a coating of paint, drying said paint coat, and coating the painted surface with a film of a cellulose ester in solution.

12. The process of making a floor covering which comprises impregnating a felt base with a flexible filling material, coating said felt base with a coating of paint, drying said paint coat, and coating the painted surface with a solution of a cellulose ester.

13. The process of making a floor covering which comprises impregnating a felt base with a flexible filling material, coating said felt base with a coating of paint, drying said paint coat, and coating the painted surface with a mixture of a cellulose ester and a softening medium.

14. The process of making a floor covering which comprises impregnating a felt base with a flexible filling material, coating said felt base with a coating of paint, drying said paint coat, and coating the painted surface with a mixture of nitrocellulose and a softening medium.

15. The process of making a floor covering which comprises impregnating a felt base with a flexible filling material, coating said felt base with a decorative coating of paint, drying said paint coat, and coating the painted surface with a transparent film of a cellulose ester in solution.

16. The process of making a floor covering which comprises impregnating a felt base with a flexible filling material, coating said felt base with a decorative coating of paint, drying said paint coat, and coating the painted surface with a transparent film of nitrocellulose and a softening medium in solution.

17. A smooth surface floor covering comprising a porous base impregnated with a flexible saturant filling material, an outer wear coating of a transparent film of a cellulose ester, and immediately beneath said film and between said film and said base a paint coat visible through the film.

18. A smooth surface floor covering comprising a porous fibrous base impregnated throughout with a flexible saturant filling material, an outer wear coating of a transparent film of a cellulose ester, and immediately beneath said film and between said film and said base a decorative paint coat visible through the film of the wear coating.

19. The process of making a floor covering which comprises impregnating a porous base with a flexible saturant filling material, coating said base with a coating of paint, drying said paint coat and coating the painted surface with a film of a cellulose ester in solution.

20. The process of making smooth surface floor coverings which process comprises impregnating a porous fibrous base with a flexible saturant filling material so that the filling material extends substantially throughout the base and provides a relatively smooth surface for the base, coating said base with a coating of paint, drying said paint coat, and coating the painted surface with a film of a cellulose ester in solution, said film being transparent to display the paint coat therebeneath.

In testimony whereof I affix my signature.

CALEB MARSHALL TAYLOR.

Certificate of Correction.

It is hereby certified that in Letters Patent No. 1,562,386, granted November 17, 1925, upon the application of Caleb Marshall Taylor, of Elizabeth, New Jersey, for an improvement in "Floor Coverings and Processes of Making the Same," an error appears in the printed specification requiring correction as follows: Page 1, line 88, for the word "or" read *to;* and that the said Letters Patent should be read with this correction therein that the same may conform to the record of the case in the Patent Office.

Signed and sealed this 5th day of January, A. D. 1926.

[SEAL.]
WM. A. KINNAN,
*Acting Commissioner of Patents.*